United States Patent Office 3,460,242
Patented Aug. 12, 1969

3,460,242
METHOD FOR SECURING MOTOR
WINDING HEADS
Peter P. Grad, Woodstock, N.Y., assignor to Rotron
Manufacturing Company, Inc., Woodstock, N.Y., a corporation of New York
Original application Oct. 4, 1965, Ser. No. 492,607, now Patent No. 3,407,321, dated Oct. 22, 1968. Divided and this application July 3, 1968, Ser. No. 742,364
Int. Cl. H02k 15/00; H01f 7/06
U.S. Cl. 29—596                                    6 Claims

ABSTRACT OF THE DISCLOSURE

A method for securing the windings in a dynamoelectric machine to a winding frame, in which an end cap, having a radial flange at one end of a body portion and at least one resilient arm extending from the other end of the body portion, is placed against the end of the frame to be wound. During winding, the resilient arm is held away from the frame so that the end turns of the winding overlie the flange to secure the end cap structure to the frame. When winding is complete, the resilient arm is released, whereby it returns toward its normal position to engage the end turns of the winding and keep them in place.

---

This application is a division of copending U.S. application Ser. No. 492,607, filed Oct. 4, 1965 now U.S. Patent No. 3,407,321.

This invention relates to techniques for the winding of electric motors, and more particularly to a clamping means and method for securing the end turns of motor windings to their supporting elements.

The stators and/or rotors of conventional motors comprise a stack of laminations (or in some cases solid cores) having slots formed therein into which coil windings of the motors are inserted, either manually or by machine. The end turns of the coil windings (portions of the wire crossing from slot to slot) form the winding head of the motor and usually contain two or more groupings or bundles of conductors. After the windings have been formed on the stator or rotor, the winding heads must be secured so that the individual turns of the winding head do not deform or interfere with subsequent processing and handling, and so that the winding head will not come into contact with the moving part of the motor after assembly.

Heretofore, this has been accomplished by tying, taping, or sewing the individual wire bundles of the winding head. Often, taping of the bundles is precluded once the rotor or stator has been wound, and hand tying becomes the only alternative. Tying, however, is not only an expensive, time-consuming operation, but may jeopardize the quality of the finished motor winding, since the steel needles employed in the tying of the windings can easily damage the thin insulation of the wire conductors.

One object of the invention, therefore, is to provide a novel method for securing the winding heads of motor parts which avoids the disadvantages of presently known expedients.

Another object of the invention is to provide improved methods for winding motor parts which are simpler, faster and produce better finished products than presently known techniques.

These and other objects of the invention are achieved with the aid of insulating end caps which include flanged body portions adapted to be mounted at the respective ends of the motor part being wound and a plurality of resilient means or fingers extending outwardly from the body portions and shaped to clamp the wire bundles of winding heads against ends of the motor part. During winding, the resilient fingers, any suitable number of which may be used, are held away from the slot ends so as not to interfere with the insertion of the windings. When the winding has been completed, the resilient fingers are released and they spring back to their initial positions, thereby clamping the end turns of the windings and holding them against the flange and in position relative to the motor part. Thereafter, heat and pressure may be applied to the end cap to further compact and form the winding head.

For a better understanding of the invention, reference may be made to the following detailed description, taken in conjunction with the accompanying drawings, in which.

Figure 1:
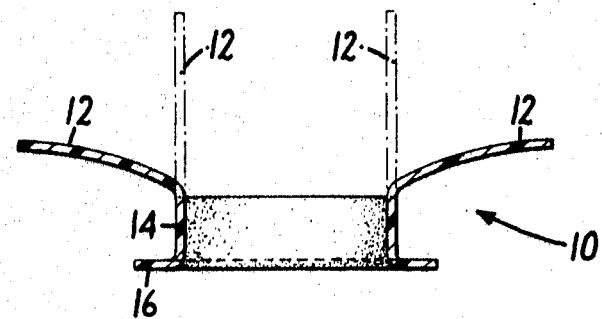
FIGURE 1 is a cross section of an end cap according to the invention.

FIGURE 1 illustrates a preferred embodiment of an end cap suitable for use with the method according to the invention. The end cap 10 comprises a body portion and two outwardly extending resilient members, or fingers 12. The body portion includes a cylindrical collar 14 and a flange 16 extending radially around the collar at one end thereof. The collar 14 may, of course, be formed in any geometrical configuration, such as a square, and may be shaped to meet the particular geometries of the motor part with which it is to be used. The cap can be made from a number of materials, including polyolefins and nylon. These materials, because of their substantial plastic memory characteristic, permit prolonged deflection or deformation of the projecting fingers 12 without permanent distortion. Thus, the fingers 12 can be deflected outwardly, as illustrated by the phantom lines, and be held in that position during the winding of a motor part, and will return to their normal, or prestressed, positions upon being released after winding.

Figure 2:
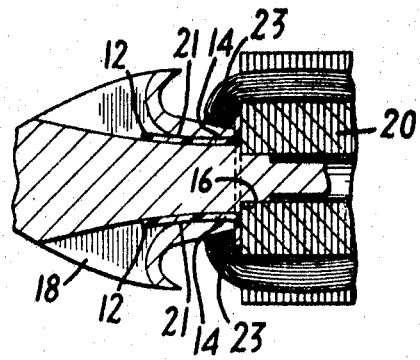
FIGURE 2 is a cross section view showing the end cap of FIGURE 1 in position for winding, relative to a motor stator and a winding mandrel.

FIGURE 2 shows the cap of FIGURE 1 positioned in the winding mandrel 18 used in a conventional automatic winding machine. Such mandrels, which are inserted at each end of the motor part and mounted on a common support bar extending therethrough, are generally arrowhead-shaped with smooth, conical points to allow the wire to slide readily over them. The motor part with attached mandrels, is firmly held in a cylindrical hollow formed in the opposing faces of a pair of support blocks. The entire assembly is then rotated about an axis perpendicular to the line joining the mandrel points (i.e., vertical as seen in FIGURE 2) as it draws wire from a spool, the mandrels guiding the wire into the slots.

The flange 16 of the end cap is held in coaxial abutment with the end of the motor part, e.g., lamination stack 20, by the mandrel 18 and the fingers 12 of the end cap fit into suitable grooves 21 provided in the mandrel. The latter holds fingers 12 in an outwardly deflected position away from the ends of the slots and guides the wire from the spool on the winding machine into the slots. It will be understood that a similar mandrel 18 and end cap is provided at the other end of the stack 20. After winding, the mandrels 18 are removed and the resilient fingers 12 snap back to their normal positions, thus clamping the end turns 23 of the winding conductors against the respective ends of the stack 20. The end turns themselves hold the end caps firmly to the stack. The curvature of the fingers 12 aids in preventing the individual conductors in the wire bundle from straying toward the outer periphery of the stator, where they may be damaged.

Figure 3:
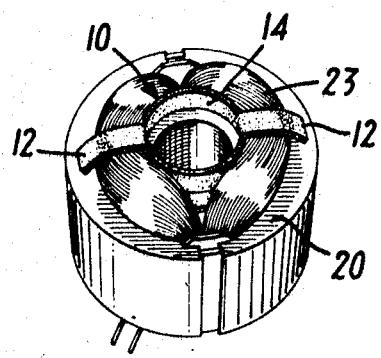
FIGURE 3 is a perspective view of a motor stator assembly utilizing the end cap of FIGURE 1.

FIGURE 3 shows a motor stator which has been wound in the manner described in connection with FIGURE 2. The action of the resilient fingers 12 on the end turns 23 can be clearly observed. Where there are many conductors in the winding, the motor head winding bundles may become relatively stiff and difficult to maintain in position. In this case, the cap 10 can be provided with additional fingers to increase the total resilient pressure applied to hold the motor head windings in position.

Although a motor structure, prepared in accordance with the foregoing such as illustrated in FIGURE 3, is adequate for many applications, it may be desired to further protect the conductors of the motor windings. Specifically, it is often desirable to bond the insulative end cap to the end turn conductors to ensure the ruggedness of the motor and also to render the motor conductors impervious to corrosive environments. In accordance with the invention, this can be accomplished by coating the insulative end cap with a thermosetting material such as polyurethane, and winding the motor with a coated magnet wire that has been over-coated with a bondable coating. Polyurethane has been found suitable for the over-coating of nylon coated magnet wire, as well. After the winding operation has been completed and the motor winding head has been secured by the coated resilient fingers (see FIG. 3), it is further formed under slight pressure and the application of heat. Processing the winding head in this manner causes the magnet wire and the fingers 12 to bond together and to form a homogeneous winding head structure. Temperatures on the order of 300° F. have been found sufficient to produce a satisfactory homogeneous bonded insulation about the winding head conductors.

A still simpler method of further forming the motor winding head can be realized by molding the insulative end cap from a copolymer and coating it with a pressure sensitive adhesive such as "Hycar." As in the previous example, the motor is wound with a magnet wire which has been over-coated with a bondable polyurethane coating. This wire is commercially available under trade names such as Bondeze. Upon completing the winding operation, the resilient members of the insulated end cap are pressed to the end turns under light pressure, causing the conductors of the winding head to adhere to the resilient members. If desired, the winding head can be further treated with varnish or potting compound, depending on the environment in which the motor is to operate.

The invention thus eliminates the need for tying, taping, or other operations involving expensive hand working of the winding head and provides a rugged coil structure at reduced cost. The end caps themselves are readily formed of inexpensive materials and no changes in the motor structure are required, since the end turns themselves hold the end caps against the stack.

Although the mandrel 18 shown in FIGURE 2 is of the type employed in a conventional automatic winding device, it will be realized that any means suitable to the winding procedure employed may be used to maintain the fingers 12 extended axially of the stack. A simple cylindrical rod with an outer ring to hold the fingers down against its outer surface, for example, may be satisfactory. The collar 14 and/or the flange 16 of the end cap may be provided with indexing ears or cutouts to simplify registry of the fingers 12 with the midpoints of the respective end turn bundles 23. It will be understood, of course, that any number of fingers 12 may be provided on the end cap, depending upon the number and thickness of the end turn bundles. The technique disclosed here is not limited to use in motor winding, but is applicable as well to various other types of coil winding.

The method described above and the mechanical components associated therewith are illustrative only, and modifications and variations may be made therein within the skill of the art without departing from the spirit and scope of the invention. All such modifications and variations, therefore, are intended to be included within the scope of the appended claims.

I claim:

1. In a method for winding electrical parts of the type including a winding head comprised of end turns at a portion of such part, the steps of locating adjacent such portion of the part a securing cap having a body portion and resilient means extending outwardly therefrom, with the body portion of the securing cap in abutting relation to the part, holding the resilient means of the end cap away from the portion of the part, winding the part to have the end turns of the windings engage and secure the body portion of the securing cap to the part, and releasing the resilient means to its outwardly extending position to hold the end turns of the winding in place relative to the part.

2. A method in accordance with claim 1 further comprising the steps of applying heat and pressure to the resilient means of the end cap to closely form the resilient means over the winding head.

3. A method according to claim 1, in which the electrical part is a motor stator core and the securing cap is located in abutting relation to the end of the motor stator core.

4. In a method for winding electrical parts including end turns, the steps of providing a winding head securing cap coated with a thermoplastic material and having a body portion and resilient members extending outwardly therefrom, placing the body portion of the end cap in abutting relation to a portion of the part over which such end turns are wound, holding the resilient members of the end cap away from such portion, winding the motor part with a conductor coated with a bondable material to form a winding head of end turns, releasing the resilient members to their outwardly extending positions, and applying heat and pressure to the end cap to bond the resilient members with the coating of the winding head conductors.

5. In a method for winding electrical parts, the steps of providing a winding head securing cap coated with a pressure-sensitive adhesive and having a body portion and resilient members extending outwardly therefrom, placing the body portion of the end cap in abutting relation to the part, holding the resilient members of the cap away from the part, winding the part with a conductor coated with a bondable material to have the windings located adjacent the cap, releasing the resilient members to their outwardly extending positions, and pressing the resilient members to the winding head conductors.

6. A method for winding electrical parts and securing the windings thereof to the part, comprising the steps of providing a winding head securing cap having a body portion and at least one resilient member extending outwardly therefrom, placing the body portion of the cap in abutting relation to the part, deflecting and holding the resilient member of the cap away from the part, winding the part with a conductor to have the windings located adjacent the body portion of the cap to thereby secure the cap to the part, and releasing the resilient member to its outwardly extending position into engagement with and to hold the windings in secured relation to the part.

References Cited

UNITED STATES PATENTS

| | | | |
|---|---|---|---|
| 1,769,063 | 7/1930 | Kimman | 310—270 |
| 2,970,237 | 1/1961 | Kent | 310—260 |
| 2,999,176 | 9/1961 | Lindstrom et al. | 310—260 X |
| 3,407,321 | 10/1968 | Grad | 310—270 |

JOHN F. CAMPBELL, Primary Examiner

C. E. HALL, Assistant Examiner

U.S. Cl. X.R.

29—605; 336—197